United States Patent
Hicks

(10) Patent No.: US 9,134,893 B2
(45) Date of Patent: *Sep. 15, 2015

(54) BLOCK-BASED CONTENT SELECTING TECHNIQUE FOR TOUCH SCREEN UI

(71) Applicant: Barnes & Noble College Booksellers, LLC, Basking Ridge, NJ (US)

(72) Inventor: Kourtny M. Hicks, Sunnyvale, CA (US)

(73) Assignee: Barnes & Noble College Booksellers, LLC, Basking Ridge, NJ (US)

( * ) Notice: Subject to any disclaimer, the term of this patent is extended or adjusted under 35 U.S.C. 154(b) by 208 days.

This patent is subject to a terminal disclaimer.

(21) Appl. No.: 13/715,415

(22) Filed: Dec. 14, 2012

(65) Prior Publication Data

US 2014/0173484 A1    Jun. 19, 2014

(51) Int. Cl.
| | |
|---|---|
| G06F 3/0486 | (2013.01) |
| G06F 3/0482 | (2013.01) |
| G06F 3/0488 | (2013.01) |
| G06F 3/0484 | (2013.01) |

(52) U.S. Cl.
CPC ............ *G06F 3/0486* (2013.01); *G06F 3/0482* (2013.01); *G06F 3/04842* (2013.01); *G06F 3/04883* (2013.01)

(58) Field of Classification Search
CPC ........................... G06F 3/0486; G06F 3/04883
USPC ......................................................... 715/769
See application file for complete search history.

(56) References Cited

U.S. PATENT DOCUMENTS

| | | | |
|---|---|---|---|
| 4,896,543 A | 1/1990 | Gullman | |
| 5,633,471 A | 5/1997 | Fukushima | |
| 5,844,557 A | 12/1998 | Shively, II | |
| 6,259,438 B1 | 7/2001 | Fleck et al. | |
| 6,938,220 B1 | 8/2005 | Shigematsu et al. | |
| 6,956,564 B1 | 10/2005 | Williams | |

(Continued)

FOREIGN PATENT DOCUMENTS

EP    0722150 A1    7/1996

OTHER PUBLICATIONS

Waleed Eissa, "Kindle Fire: How to Add Notes and Highlight Text in a Book", posted Jul. 30, 2012, http://www.technipages.com/kindle-fire-how-to-add-notes-and-highlight-text-in-a-book.*

(Continued)

*Primary Examiner* — William Bashore
*Assistant Examiner* — Daniel Rodriguez
(74) *Attorney, Agent, or Firm* — Finch & Maloney PLLC

(57) ABSTRACT

Techniques are disclosed for providing a content selecting mode in electronic touch screen devices. The content may be, for instance, text, graphics, images, files, and/or other consumable content. The user can engage the mode with a combination of gestures and touch points on the touch screen. The combination may include, for example, multiple initial touch points within a given content block, followed by a dragging gesture that moves the touch points into or otherwise within the given content block, wherein the entire content block is then highlighted/selected. The initial touch points may touch, for instance, any piece of content within that block and the subsequent dragging gesture moves those initial touch points toward another piece of content within that block. As the drag continues into other blocks, so does selecting. The techniques can be used, for example, to select entire sentences or paragraphs or other content blocks.

17 Claims, 8 Drawing Sheets

(56) References Cited

U.S. PATENT DOCUMENTS

| | | | |
|---|---|---|---|
| 7,221,376 | B2 | 5/2007 | Iwema et al. |
| 7,649,524 | B2 | 1/2010 | Haim et al. |
| 7,840,912 | B2 | 11/2010 | Elias et al. |
| 7,864,195 | B2 | 1/2011 | Rimas et al. |
| 7,877,685 | B2* | 1/2011 | Peters ............................ 715/272 |
| 7,898,541 | B2 | 3/2011 | Hong et al. |
| RE42,738 | E | 9/2011 | Williams |
| 8,059,101 | B2 | 11/2011 | Westerman et al. |
| 8,195,641 | B2 | 6/2012 | Rucker et al. |
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 8,606,326 | B2 | 12/2013 | Oh et al. |
| 8,786,559 | B2 | 7/2014 | Hogan |
| 2001/0025289 | A1 | 9/2001 | Jenkins et al. |
| 2002/0057263 | A1* | 5/2002 | Keely et al. .................... 345/179 |
| 2002/0116421 | A1 | 8/2002 | Fox et al. |
| 2007/0047002 | A1 | 3/2007 | Hull et al. |
| 2008/0036743 | A1* | 2/2008 | Westerman et al. .......... 345/173 |
| 2008/0036747 | A1 | 2/2008 | Hope |
| 2010/0100854 | A1 | 4/2010 | Russell et al. |
| 2010/0103124 | A1 | 4/2010 | Kruzeniski et al. |
| 2010/0192086 | A1 | 7/2010 | Kocienda et al. |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1 | 12/2010 | Steinberger et al. |
| 2011/0163968 | A1 | 7/2011 | Hogan |
| 2011/0231796 | A1 | 9/2011 | Vigil |
| 2011/0258542 | A1 | 10/2011 | Kenney et al. |
| 2011/0310026 | A1* | 12/2011 | Davis et al. .................... 345/173 |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0221938 | A1 | 8/2012 | Patterson et al. |
| 2012/0229397 | A1* | 9/2012 | Cho et al. ...................... 345/173 |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0306772 | A1* | 12/2012 | Tan et al. ....................... 345/173 |
| 2012/0311438 | A1 | 12/2012 | Cranfill et al. |
| 2012/0329529 | A1 | 12/2012 | van der Raadt |
| 2013/0016045 | A1 | 1/2013 | Zhao et al. |
| 2013/0031472 | A1* | 1/2013 | Ueno et al. .................... 715/251 |
| 2013/0036383 | A1 | 2/2013 | Yuan et al. |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |
| 2014/0173483 | A1 | 6/2014 | Hicks |

OTHER PUBLICATIONS

Kottke.org, "New iPhone features", available Dec. 14, 2007, http://web.archive.org/web/20071214090025/http://www.kottke.org/07/07/new-iphone-features.*

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

KIRUPA, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patnetlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.

(56) References Cited

OTHER PUBLICATIONS engadget.com/2013/01/08/panasonic-mobile-devices-to-use-anoto-pattern-pen-, 4 pages, printed from the Internet on Jun. 20, 2013.
"Bluetooth 4.0 SmartPen the future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.
Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=, 1 page, printed from the Internet on Jan. 15, 2013.
Non-Final Office Action received for U.S. Appl. No. 13/715,327. Mail date: Oct. 6, 2014. 19 pages.

* cited by examiner

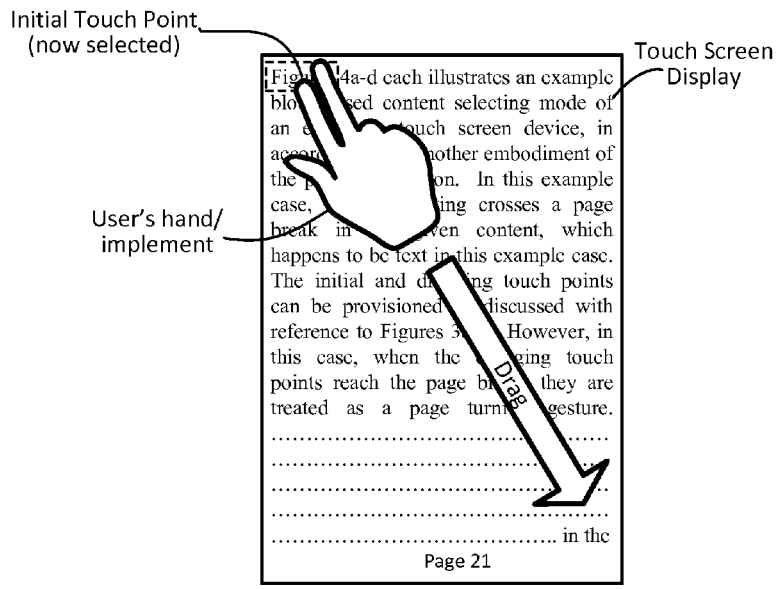
Fig. 4a
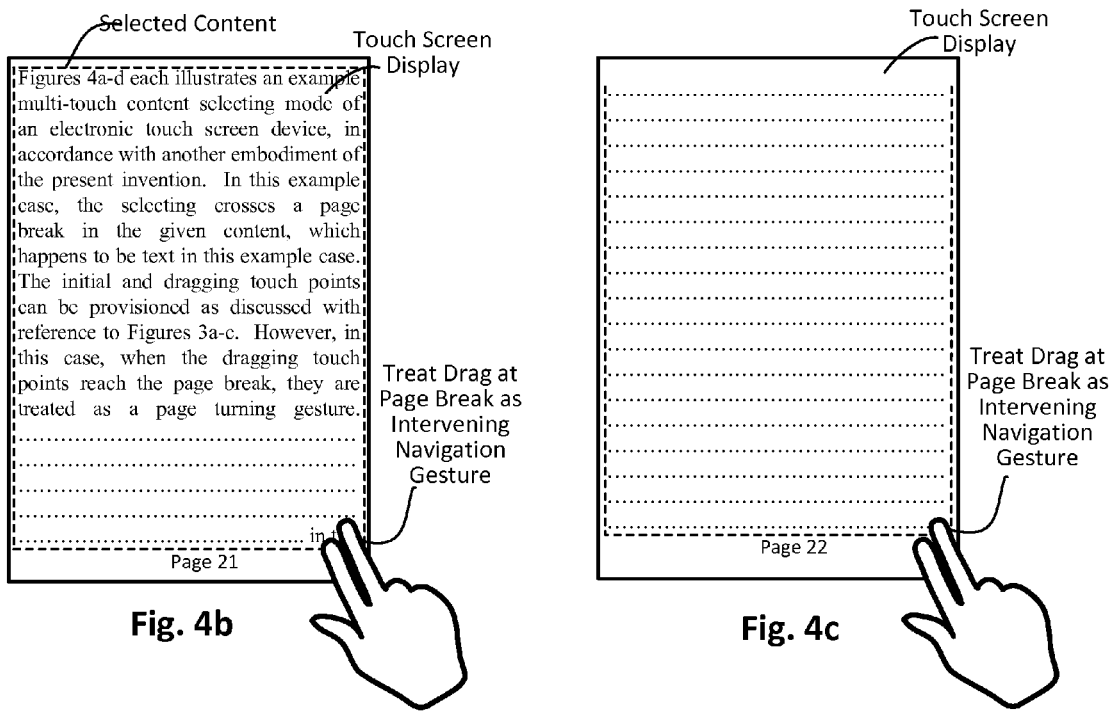
Fig. 4b
Fig. 4c

BLOCK-BASED CONTENT SELECTING TECHNIQUE FOR TOUCH SCREEN UI

FIELD OF THE DISCLOSURE

This disclosure relates to electronic display devices, and more particularly, to user interface (UI) techniques for interacting with touch screen devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

BRIEF DESCRIPTION OF THE DRAWINGS

FIG. 3c' illustrates an example content selecting mode of an electronic touch screen device, in accordance with another embodiment of the present invention.

FIGS. 4a-e illustrate an example content selecting mode of an electronic touch screen device, in accordance with another embodiment of the present invention.

DETAILED DESCRIPTION

Figure 1A:
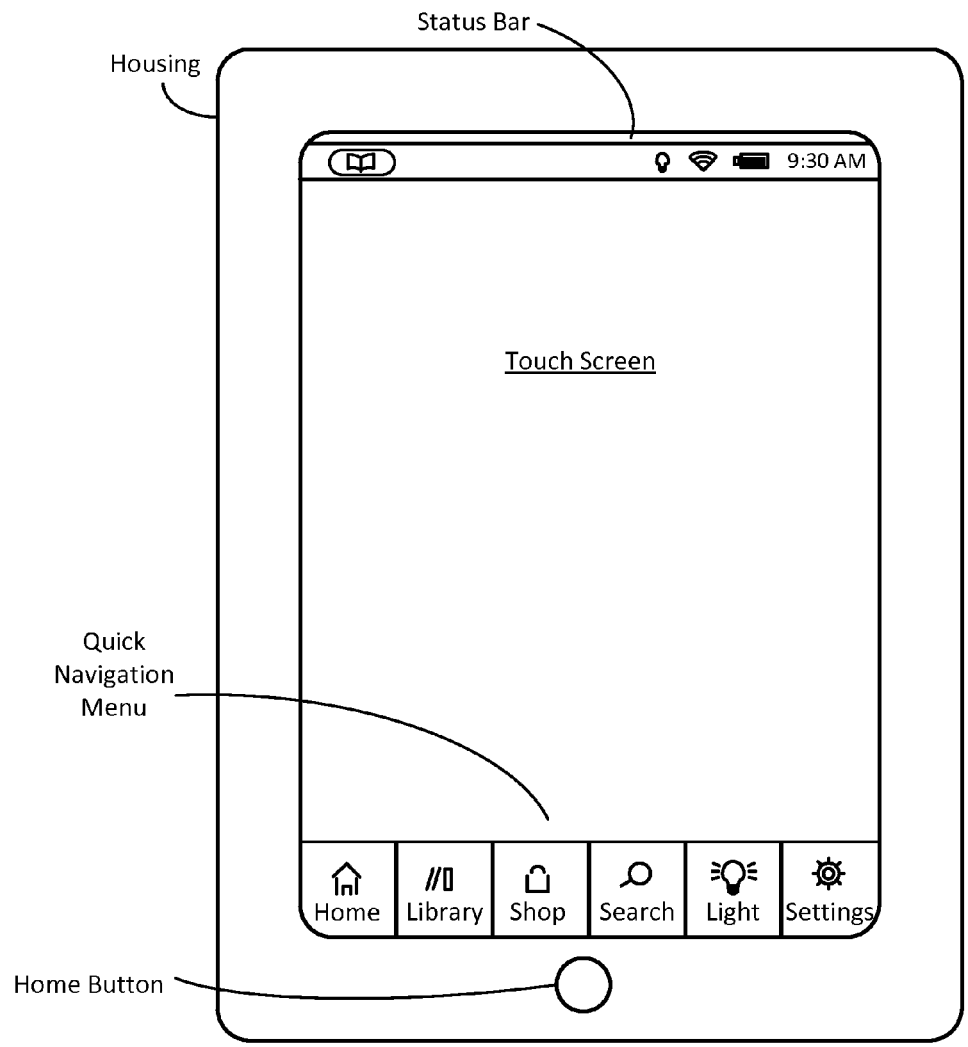
FIGS. 1a-b illustrate an example electronic touch screen device having a content selecting mode configured in accordance with an embodiment of the present invention.

Techniques are disclosed for providing a content selecting mode in electronic touch screen devices. The content may be, for instance, text, graphics, images, files, and/or other consumable content. The user can engage the mode with a combination of gestures and touch points on the touch screen. The combination may include, for example, multiple initial touch points within a given block of content, followed by a dragging gesture that moves the touch points into or otherwise within the given content block, wherein the entire content block is then highlighted/selected. The initial touch points may touch, for instance, any piece of content within that block and the subsequent dragging gesture moves those initial touch points toward another piece of content within that block. As the drag continues to other content blocks, so does selecting of the touched content blocks. The techniques can be used, for example, to select entire sentences or paragraphs or photo/music albums or other content blocks, including any rich media such as video, audio or other interactive elements embedded within a given more or more content blocks.

General Overview

As previously explained, electronic display devices such as tablets, eReaders, and smart phones are commonly used for displaying user interfaces and consumable content. The user of such devices can typically consume the displayed content with relative ease. In some instances, the user may wish to select a portion of the given content for the purpose of copying that portion to a so-called clip board so that it can subsequently be pasted into another document. While available content selection techniques are commonly provided with touch screen devices for such purposes, such techniques require the user to drag a handle or other such user interface feature from the start location to the desired end location. Moreover, such drag-based techniques seemingly do not allow for the selection to continue across a page break. In this sense, the user is required to carry out multiple selection actions, depending on the number of pages over which the target content spans.

Thus, and in accordance with an embodiment of the present invention, content selection techniques are disclosed for use in electronic touch screen devices. The content may include, for example, text, graphics, images, folders/files, embedded audio and/or video files, and/or any other consumable content. The user can engage the mode with a combination of gestures and multiple touch points on the touch screen. The combination may include, for example, two or more initial touch points at a location within a given block of content, followed by a dragging gesture that moves those touch points into or otherwise within the given block of content, wherein the entire block of content is then highlighted or otherwise selected. The initial touch points may touch, for instance, a piece of content within that block and the subsequent dragging gesture moves those initial touch points toward another piece of content within that block.

The 'piece of content' and 'content block' terms can be extrapolated into any number of piece/block pair constructs to accommodate numerous diverse applications, as will be appreciated in light of this disclosure. For example, the block of content may be a sentence of text within a given digital document and a piece of content may be a word within that sentence, in accordance with an embodiment. In another example, the block of content may be a paragraph of text within a given digital document and a piece of content may be a word within that paragraph. In another example, the block may be a section or chapter of text or rich media within a given digital text book and a piece of content may be a word or embedded file (e.g., audio/video) within that section or chapter. In another example, the block may be a group of images within a given photo album and a piece of content may be an image within that album. In another example, the block may be a group of audio files within a given music album and a piece of content may be an audio file within that album. In another example, the block may be a group of videos (e.g., the 'A' videos of an alphabetical collection) and a piece of content may be a video file within that group. In another example, the block may be a group of e-folders and a piece of content may be an e-folder within that group. In a more general sense, the piece of content touched by the initial touch points may be any individually selectable (touchable) piece of displayed digital content, and the content block includes multiple such pieces of individually selectable content. Other example piece/block pairs include, for instance, sentence/paragraph, section/chapter, paragraph/chapter, sub-folder/folder, album/library, or any other scenario where a relatively smaller content component of a larger content component can be initially selected and the larger content component is automatically selected in its entirety as a drag gesture ensues from the smaller content component. A given smallest piece of content is typically separated from a neighboring piece of content by a spatial boundary (such a white space or an otherwise void in the content, such a space between words or a space between files or a space between folders, etc). In another example, consider a website or webpage or web application that includes one or more DIV elements (which generally define a generic block-level container, as is known), wherein anything inside a DIV is part of that block. Websites/webpage and web apps are often comprised of many DIV elements. The selection techniques herein can be used, for example, to select all the DIVs/blocks by dragging across them which also selects all content within those blocks.

In some example embodiments, as the multiple touch point drag continues beyond a given content block and into neighboring content blocks, the selection of those neighboring content blocks may also continue. Note that the selecting can effectively advance ahead of the dragging touch points, and the dragging touch points may then catch-up to the leading edge of the selecting. However, upon the dragging touch points entering the next content block, the selecting of that next block again advances ahead of the moving touch points. This process may repeat as long as the user wishes to maintain the block content selecting mode and continues with the dragging touch points. Once the drag is released, the selected content can then be acted upon by the user. Once the desired post-selection action has been carried out, the user may exit the mode by, for example, some affirmative gesture such as a touch screen tap or a home button press or some other user engagement of an appropriate UI software or hardware feature, in accordance with some embodiments. The user can move the touch points in any direction without having to be on a specific drag zone like handles of conventional selecting techniques. In addition, the techniques can be used to speed-up content selection by selecting entire sentences or paragraphs or albums or other relatively large content blocks that are made up of relatively smaller pieces of selectable content, as previously described. As will be appreciated, the term 'highlighted' as used herein refers to content being selected, and does not necessarily mean that a formatting change to the content has been executed. For instance, content can be selected/highlighted, and then a formatting change (e.g., bolding and/or color) can be executed on that selected content. In this sense, highlighting may refer to, for example, any indication of a content selection, which may or may not include a formatting change.

In some example cases, the initial piece of content may be, for example, a word, graphic, image, file, folder, or other touchably and individually selectable piece of displayed digital content, and may be initially highlighted by itself. Such accentuating of the initial piece of content can be used to visually inform the user that the initial touch point of a content selection action is in place, which may be helpful to the user. In some cases, the delay from application of the initial touch point(s) to selecting of the piece of content may be user-configurable or a pre-established delay time (e.g., 2 to 4 seconds), as may the minimum distance of the dragging touch point movement from the initial touch point that is needed to cause selecting of the entire content block. In other example embodiments, the content block may be selected all at once immediately after the dragging touch points proceed from the initial touch point location.

The selected content may be one or more continuous blocks of displayed content on a given page, or may traverse section breaks or column breaks within a given page, depending on the progression of the multi-touch drag point. Likewise, the selected content may traverse any number of page breaks as needed, depending on the progression of the multi-touch drag point. In such multi-page selection scenarios, an intervening navigational gesture may be presumed when the drag point reaches a page break thereby causing navigation to the next logical page of content so that the content block selecting process may continue in a seamless and uninterrupted fashion, in accordance with some embodiments of the present invention. In some such cases, the user interface may be programmed or otherwise configured, for example, to temporarily re-categorize or otherwise treat a multi-point dragging gesture that reaches a page break area as a swiping navigation gesture. As the multi-point dragging gesture rests on the page break, a next page is displayed and fully selected after a brief delay. When the user moves the multiple touch points off of the page break area and back into a currently displayed page, dragging gesture functionality resumes and the user can adjust the block content selecting within that page as described herein. As will be further appreciated in light of this disclosure, the user may select multiple non-contiguous blocks of content if so desired. For example, the user may select a first content block on pages 1-4 of a digital text book using initial/dragging touch points as described herein, and then select a second block on pages 9-10 of that book in a similar manner, etc). In such example cases, the selected content blocks can stay selected until the user affirmatively exits the content selection mode.

Note that the 'next' block of content may be logically located either above or below the current block of content (or to the left or right of the current block of content), within the overall given structure of the content. The selecting is respectful of the content structure and natural flow of the consumption path, and only content between (and including) the start and end locations of a selected block is selected, in accordance with some embodiments. In some cases, the selected content can be indicated with a color change associated with the selected block, and/or with brackets or handles or virtual bookends or dashed outlining, or with other visual indicators that effectively highlight or otherwise accentuate the block(s) of selected content. The user may configure such features, in some embodiments. In other embodiments, such features may be provisioned by default or hard-coded. Any number of such highlighting techniques can be used to provide the user with a visual indicator of the selected content, as will be appreciated in light of this disclosure.

Once selected, the user can then operate on the selection, in accordance with some embodiments. For example, the user can execute a copy-and-paste operation (e.g., via control-c and control-p keystrokes, or via 'copy' and 'paste' button presses) so that the selected portion of content is copied to the device clip board so that it can subsequently be pasted into another location/document. Likewise, the user can execute a cut-and-move operation (e.g., via control-x and control-p keystrokes, or via 'cut' and 'paste' button presses) so that the selected portion of content is removed to the device clip board so that it can subsequently be pasted into another location/ document. In some such embodiments, copy, cut, and paste UI press-button features can be displayed to the user via the touch screen to facilitate such copying, cutting, and pasting by the user. In another example embodiment, the user can apply a formatting change to the selected portion, such as a change in font or pitch or color with respect to selected text, or a change from color to black-and-white or grayscale with respect to selected images, etc. In another example embodiment, the user can apply a security change to the selected portion, such as a change in access permissions with respect to selected files or folders, etc. In another example embodiment, the user can perform a dictionary look-up or search based on the selected content. In a more general sense, once the content is selected, any number of post-selection actions can then be applied to that selection content. In still other example embodiments, the user may wish to simply highlight the selected portion of content to make it easier to see or find within the document. In any such cases, any number of suitable UI control features (e.g., copy/cut/paste/format UI press-buttons) can be provided to the user, depending on the given context and application in which the user is operating, as well as capabilities of the device. In some embodiments, an 'exit' UI press-button feature can also be displayed (or the equivalent thereof), which the user can tap or otherwise engage to end the content selection operation. Such example UI control features can be displayed automatically to user once the content is selected, in accordance with some embodiments.

Given the global nature and/or uniqueness of the engagement mechanism, in accordance with some embodiments, the block-based content selection mode can be similarly invoked within multiple diverse applications (e.g., eBook, browser, picture viewer, file manager, etc) and without conflicting with other global gestures that might also be used by the device's operating system. While some example embodiments include two initial touch points followed by a two point dragging gesture, other embodiments may include a different scheme (e.g., single point touch to start followed by a two point dragging gesture, or a three point touch to start followed by a three point dragging gesture, etc). In a more general sense, any uniquely identifiable combination of touch points and dragging gestures can be used to engage a seamless and uninterrupted block-based content selecting mode, in accordance with an embodiment of the present invention. The uniqueness of the touch point/drag scheme may be based, for example, on the number of touch points simultaneously provided and/or the nature of the touch (e.g., a quick initial tap followed by a drag, a press-and-hold for a predetermined duration followed by a drag, a sequence of taps followed by a drag, an initial swipe followed by a drag, an initial circular and/or elliptical gestures followed by a drag, etc). As will be further appreciated, the uniqueness of the touch point/drag scheme may exist, for example, at the global level or the application level.

The techniques allow for block-based content selecting in a relatively fast, efficient, and intuitive manner, so that the user can seamlessly and selectively engage and/or disengage the mode without disrupting the consumption experience, in accordance with some embodiments. In some such cases, the user can move the dragging gesture in either direction to advance or retreat the selected section, without having to be on a specific drag zone. The touch point(s) and dragging gestures may be provided by the user's fingers or any suitable implement, such as a stylus.

Architecture and Applications

Figure 1B:
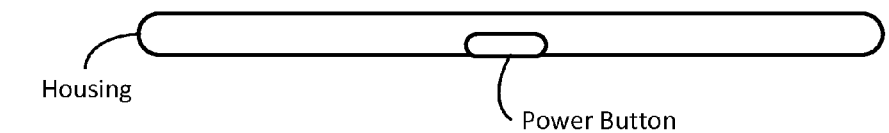

FIGS. 1a-b illustrate an example electronic touch screen device having a content selecting mode configured in accordance with an embodiment of the present invention. The device could be, for example, a tablet such as the NOOK® Tablet or NOOK® eReader by Barnes & Noble. In a more general sense, the device may be any electronic device having a touch screen user interface and capability for displaying content to a user, such as a mobile phone or mobile computing device such as a tablet or laptop, a desktop computing system, a television, a smart display screen, or any other device having a touch screen display. As will be appreciated, the claimed invention is not intended to be limited to any particular kind or type of electronic device.

As can be seen with this example configuration, the device comprises a housing that includes a number of hardware features such as a power button and a press-button (sometimes called a home button herein). A touch screen based user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI touch screen controls and features, or different UI touch screen controls and features altogether, depending on the target application of the device. Any such general UI controls and features can be implemented using any suitable conventional or custom technology, as will be appreciated.

The power button can be used to turn the device on and off, and may be used in conjunction with a touch-based UI control feature that allows the user to confirm a given power transition action request (e.g., such as a slide bar or tap point graphic to turn power off). In this example configuration, the home button is a physical press-button that can be used as follows: when the device is awake and in use, tapping the button will display the quick navigation menu, which is a toolbar that provides quick access to various features of the device. The home button may also be configured to cease an active function that is currently executing on the device, such as a content selecting mode as described herein. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device was stowed into a bag or purse. One physical gesture that would safely put the device to sleep. Thus, in such an example embodiment, the home button may be associated with and control different and unrelated actions: 1) show the quick navigation menu; 2) exit the content selecting mode, but keep the page being read or otherwise consumed displayed (e.g., so that another mode can be entered, if so desired); and 3) put the device to sleep. Numerous other configurations and variations will be apparent in light of this disclosure, and the claimed invention is not intended to be limited to any particular set of hardware buttons or features, or device form factor.

As can be further seen, the status bar may also include a book icon (upper left corner). In some such cases, the user can access a sub-menu that provides access to a content selecting mode configuration sub-menu by tapping the book icon of the status bar. For example, upon receiving an indication that the user has touched the book icon, the device can then display the content selecting mode configuration sub-menu shown in FIG. 1d. In other cases, tapping the book icon just provides bibliographic information on the content being consumed. Another example way for the user to access a content selecting mode configuration sub-menu such as the one shown in FIG. 1d is to tap or otherwise touch the Settings option in the quick navigation menu, which causes the device to display the general sub-menu shown in FIG. 1c. From this general sub-menu the user can select any one of a number of options, including one designated Screen/UI in this specific example case. Selecting this sub-menu item (with an appropriately placed screen tap) may cause the content selecting mode configuration sub-menu of FIG. 1d to be displayed, in accordance with an embodiment. In other example embodiments, selecting the Screen/UI option may present the user with a number of additional sub-options, one of which may include a content selecting mode option, which may then be selected by the user so as to cause the content selecting mode configuration sub-menu of FIG. 1d to be displayed. Any number of such menu schemes and nested hierarchies can be used, as will be appreciated in light of this disclosure.

As will be appreciated, the various UI control features and sub-menus displayed to the user are implemented as UI touch screen controls in this example embodiment. Such UI touch screen controls can be programmed or otherwise configured using any number of conventional or custom technologies. In general, the touch screen translates the user touch in a given location into an electrical signal which is then received and processed by the underlying operating system (OS) and circuitry (processor, etc). Additional example details of the underlying OS and circuitry in accordance with some embodiments will be discussed in turn with reference to FIG. 2a.

Figure 1C:
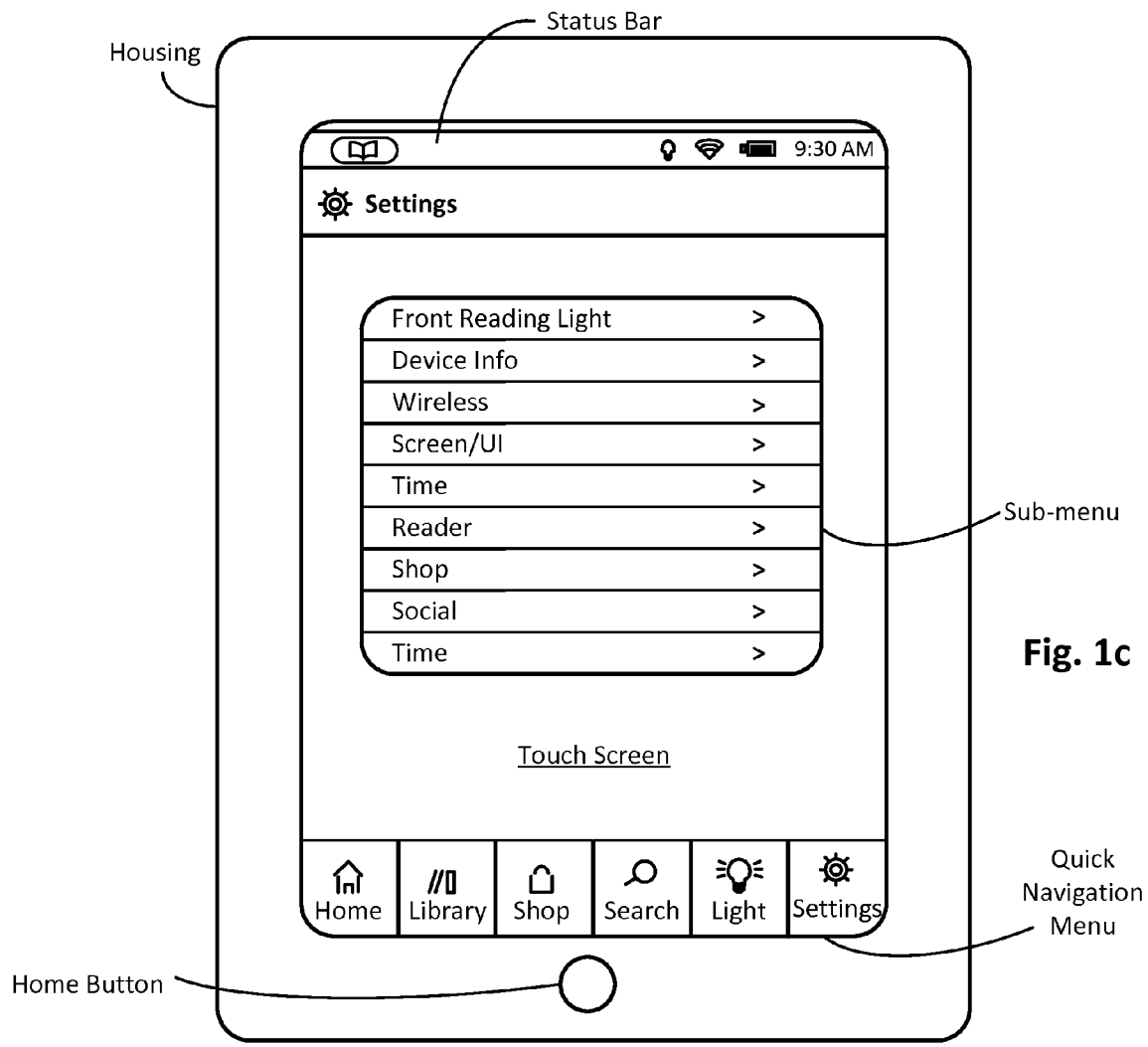
FIG. 1c-d illustrate example configuration screen shots of the user interface of the electronic touch screen device shown in FIG. 1a-b, configured in accordance with an embodiment of the present invention.
Figure 1D:
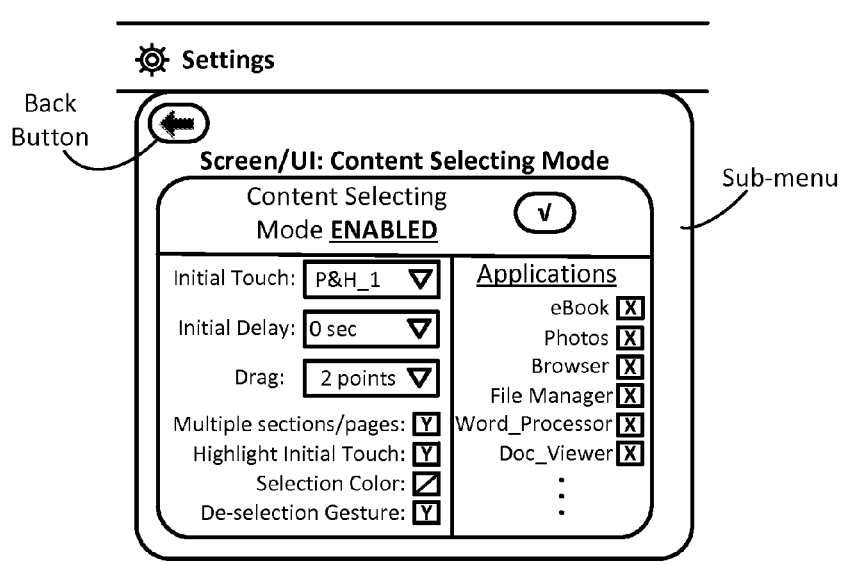

As previously explained, and with further reference to FIGS. 1c and 1d, once the Settings sub-menu is displayed (FIG. 1c), the user can then select the Screen/UI option. In response to such a selection, the content selecting mode configuration sub-menu shown in FIG. 1d can be provided to the user. In this example case, the content selecting mode configuration sub-menu includes a UI check box that when checked or otherwise selected by the user, effectively enables the content selecting mode (shown in the enabled state); unchecking the box disables the mode. Other embodiments may have the content selecting mode always enabled, or enabled by a physical switch or button, for example. The user can configure a number of features with respect to the content selecting mode, in some cases. Other embodiments are not configurable.

In this example embodiment, once the content selecting mode is enabled, the user can choose the type of contact desired for each of the initial and drag touch points that will be used to select the target content block. For instance, in the example configuration shown, each of the initial and drag touch points is set via a pull-down menu, with the 'Initial Touch' point set to a press-and-hold single touch point (P&H_1) and the 'Drag' touch points set to two. An example set of initial touch point choices that can be offered by the initial touch point pull-down menu is

TABLE 1

Example Initial Touch Point Choices

| Choice | Type |
| --- | --- |
| P&H_1 | Single touch point press-and-hold, on piece of content within target content block |
| P&H_2 | Double touch point press-and-hold, on piece of content within target content block |
| P&H_3 | Triple touch point press-and-hold, on piece of content within target content block |
| Diagonal_1 | Single touch point diagonal swipe thru piece of content within target content block |

TABLE 1-continued

Example Initial Touch Point Choices

| Choice | Type |
| --- | --- |
| Diagonal_2 | Double touch point diagonal swipe thru piece of content within target content block |
| Circular_1 | Single touch point circle around/thru piece of content within target content block | provided in Table 1. As will be appreciated, numerous variations will be apparent in light of this disclosure. The provided contact can be on a piece of content (press-and-hold touch point) within the target content block, or can pass thru a piece of content (mini-swipe/diagonal or rotating gesture touch point) within the target content block, or some other contact that at least partially touches a piece of content within the target content block. In any such cases, the initial touch point gesture transitions to the drag gesture, with or without delay, depending on the number of initial touch points, in accordance with an embodiment. In one example such embodiment, only a single touch point press-and-hold gesture need be associated with a delay (e.g., 3 seconds) so as to distinguish it from other single touch point press-and-hold gestures associated with other functions. This initial delay may be user-configurable as shown in the example of FIG. 1d, and may be grayed out or set to zero when not needed as a qualifier. For instance, a double or triple initial touch point press-and-hold gesture is more unique and may therefore not need to be further qualified or otherwise distinguished. With further reference to Table 1, a diagonal gesture thru the initial piece of content within the target content block can also be provided with any number of touches (e.g., 1 finger swipe, 2 finger swipe, . . . , etc), and then readily transition into the drag gesture. Likewise, a circular gesture can also pass thru a piece of content within the target content block and may be provided with any number of touches (e.g., 1 finger, 2 finger, . . . , etc). As will be further appreciated, a multi-touch initial touch point may cause not only the initial piece of content within the target content block to be selected, but may also select neighboring pieces of content depending on the broadness of the touch, in some embodiments. Numerous configuration or implementation schemes that allow for a content selection mode that can be globally and/or uniquely activated as needed and without conflicting with other UI touch screen commands/gestures supported by the device will be apparent in light of this disclosure. Another example of user-configurable functionality would be to allow selection of non-contiguous blocks (e.g., via a UI check box or other suitable mechanism), although other embodiments may hard-code such functionality. Further note that styluses or other implements may also be used to provide the initial and dragging touch points as well, and the claimed invention is not intended to be limited to any particular manner of causing the various touch points.

In the example embodiment of FIG. 2d, the user is further allowed to enable multi-section or multi-page selection operations, by selecting yes (Y) with respect to the 'Multiple sections/pages' UI feature. In other embodiments, such a feature may be enabled by default (i.e., no configuration needed). As can be further seen, the user may also enable highlighting of the initial touch point, by selecting yes (Y) with respect to the provisioned 'Highlight Initial Touch' UI feature. In such cases, the initial piece of content within the target content block will be highlighted or otherwise selected, for example, after a predetermined delay (e.g., if a single initial touch point), or immediately (e.g., if multiple or otherwise unique initial touch point). In other cases, only a sound effect is given as an indication that the initial touch point has been received. In still other embodiments, both aural and visual cues are provided to make that indication. Note, however, that such cues/indications need not be given in all embodiments. Numerous variations and configurations will be apparent in light of this disclosure.

With further reference to the example embodiment of FIG. 1d, the user may also specify a color scheme with respect to the selected content. For instance, the user can select a transparent background color that will effectively encapsulate the selected content, and an opaque background color that will effectively obfuscate the non-selected content. The selected color scheme can be shown in a UI feature such as a divided square as shown (one half is transparent color/one half is opaque color). Other embodiments may automatically apply a given transparent color to the selected content without doing anything to non-selected content, or outline the selected content with a dashed line or other border, for example. Another embodiment may be configured to gray-out or otherwise soften unselected content. Numerous highlighting schemes can be used, and the claimed invention is not intended to be limited to any particular one.

With further reference to FIG. 1d, the user may also enable a de-selection gesture by selecting yes (Y) with respect to the 'De-selection Gesture' UI feature. In such cases, the selected content will stay selected until the user executes the de-selection gesture. For example, the user may de-select the selected content by pressing the home button, or tapping the touch screen in a specific area or over the selected content. In another example case, the user may de-select the selected content by executing a more complex specific gesture (which may or may not be user-configurable), such as a counter-clockwise circular gesture with two fingers, or a two finger diagonal swipe having a negative slope (from the upper left to lower right). Other embodiments may deselect the selected content after the user carries out a post-selection action. Numerous such suitable de-selection schemes can be used, and the claimed invention is not intended to be limited to any particular one.

With further reference to the example embodiment of FIG. 1d, the user may also specify a number of applications in which the content selecting mode can be invoked. Such a configuration feature may be helpful, for instance, in a tablet or laptop or other multifunction computing device that can execute different applications (as opposed to a device that is more or less dedicated to a particular application). In this example case, the available applications are provided along with a corresponding check box. Note the diverse nature of the example applications, including an eBook application, a photo viewing application, a browser application, a file manager application, a word processor application, a document viewer application, which are just a few examples. In other embodiments, the content selecting mode can be invoked whenever the initial and drag touch points are provided in the context of displayed content that is selectable, regardless of the application being used. Any number of applications or device functions may benefit from a content selecting mode as provided herein, whether user-configurable or not, and the claimed invention is not intended to be limited to any particular application or set of applications.

As can be further seen, a back button arrow UI control feature may be provisioned on the touch screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. Again, while FIGS. 1c and d show user configurability, other embodiments may not allow for any such configuration, wherein the various features provided are hard-coded or otherwise provisioned by default. The degree of hard-coding versus user-configurability can vary from one embodiment to the next, and the claimed invention is not intended to be limited to any particular configuration scheme of any kind.

Figure 2A:
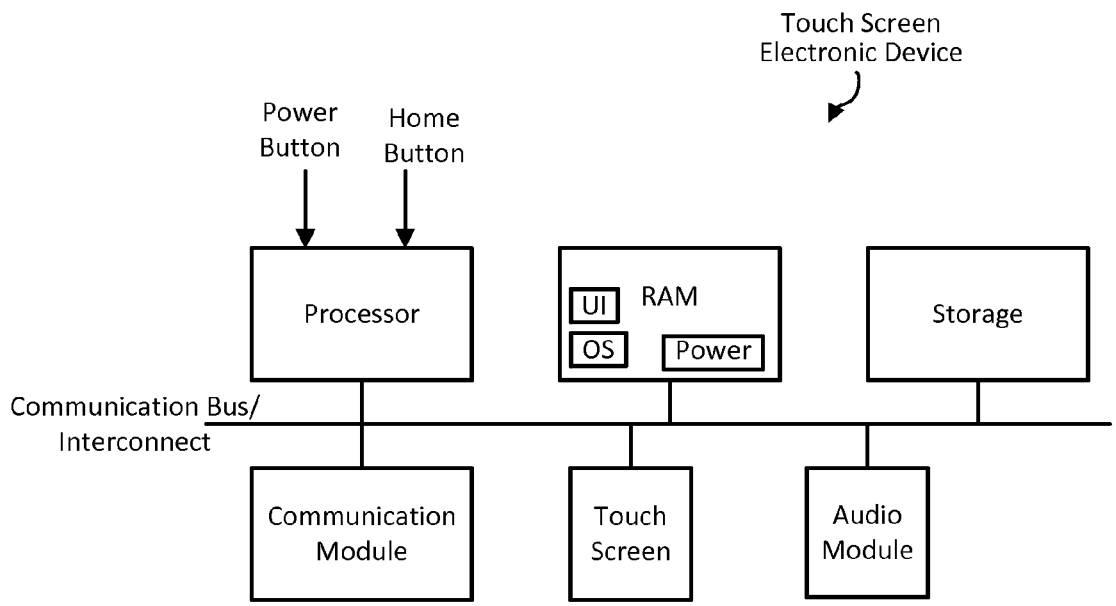
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, random access memory (RAM), additional storage/memory, a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's physical contact with the screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the RAM includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a content selecting mode as variously described herein. Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., 800 MHz Texas Instruments OMAP3621 applications processor), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The RAM can be any suitable type of memory and size (e.g., 256 or 512 Mbytes SDRAM), and in other embodiments may be implemented with non-volatile memory or a combination of non-volatile and volatile memory technologies. The storage can also be implemented with any suitable memory and size (e.g., 2 GBytes of flash memory). The display can be implemented, for example, with a 6-inch E-ink Pearl 800×600 pixel screen with Neonode® zForce® touchscreen, or any other suitable display and touchscreen interface technology. The communications module can be, for instance, any suitable 802.11 b/g/n WLAN chip or chip set, which allows for connection to a local network so that content can be downloaded to the device from a remote location (e.g., content provider, etc, depending on the application of the display device). In some specific example embodiments, the device housing that contains all the various componentry measures about 6.5" high by about 5" wide by about 0.5" thick, and weighs about 6.9 ounces. Any number of suitable form factors can be used, depending on the target application (e.g., laptop, desktop, mobile phone, etc). The device may be smaller, for example, for smartphone and tablet applications and larger for smart computer monitor and laptop applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touchscreen technology and the various example screen shots shown in FIGS. 1a-d and 3a-c', and 4a-e in conjunction with the content selecting mode methodologies demonstrated in FIG. 5, which will be discussed in turn. The audio module can be configured, for example, to speak or otherwise aurally present a selected eBook or other textual content, if preferred by the user. Numerous commercially available text-to-speech modules can be used, such as Verbose text-to-speech software by NCH Software. In such audio-based cases, note that the content selecting techniques as described herein can be used to select the textual content to be converted to audio, for instance. In some example cases, if additional space is desired, for example, to store digital books or other content and media, storage can be expanded via a microSD card or other suitable memory expansion technology (e.g., 32 GBytes, or higher).

Client-Server System

Figure 2B:
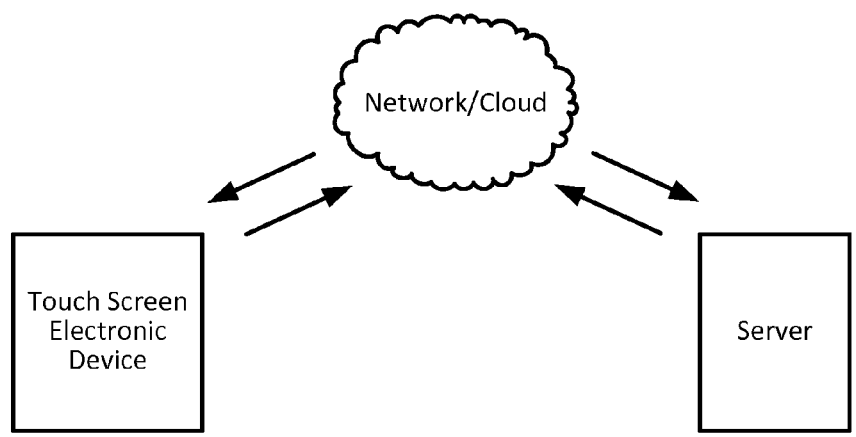
FIG. 2b illustrates a block diagram of a communication system including the electronic touch screen device of FIG. 2b, configured in accordance with an embodiment of the present invention.

FIG. 2b illustrates a block diagram of a communication system configured in accordance with an embodiment of the present invention. As can be seen, the system generally includes an electronic touch screen device (such as the one in FIG. 2a) that is capable of communicating with a server via a network/cloud. In this example embodiment, the electronic touch screen device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch screen device and to respond to those requests by providing the user with requested or otherwise recommended content. Is some such embodiments, the server is configured to remotely provision a content selecting mode as provided herein to the touch screen device (e.g., via JavaScript or other browser based technology). In other embodiments, portions of the content selecting methodology are executed on the server and other portions of the methodology are executed on the device. Numerous server-side/client-side execution schemes can be implemented to facilitate a content selecting mode in accordance with an embodiment, as will be apparent in light of this disclosure.

Content Select Mode Examples

Figure 3A:
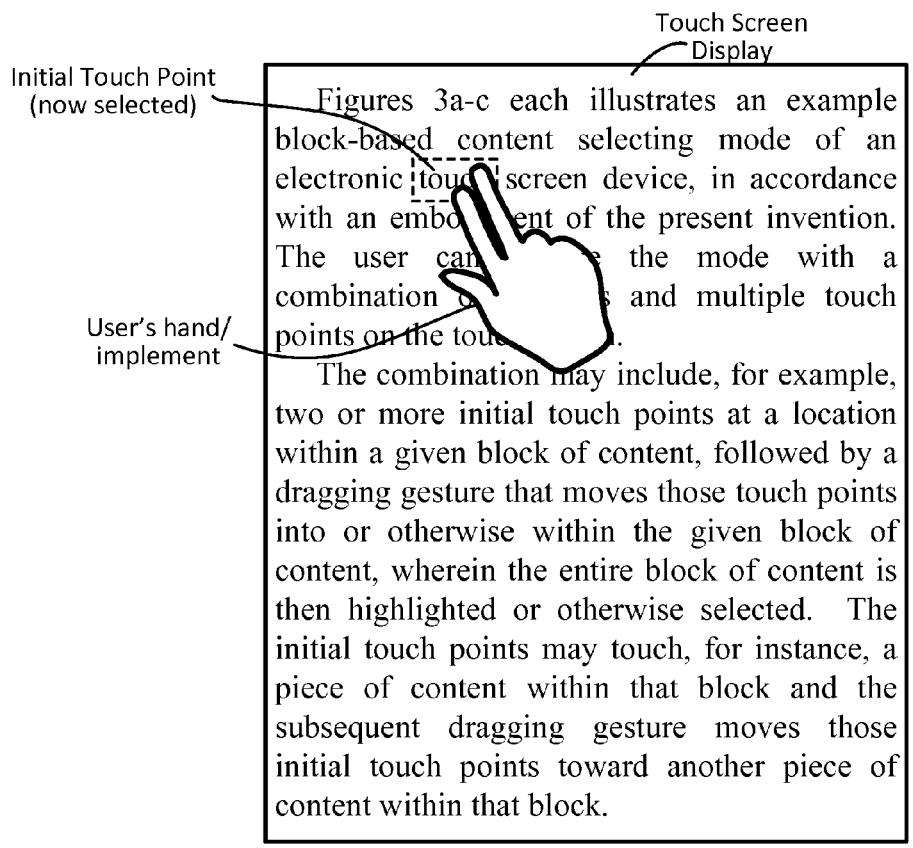
FIGS. 3a-c illustrate an example content selecting mode of an electronic touch screen device, in accordance with an embodiment of the present invention.
Figure 3B:
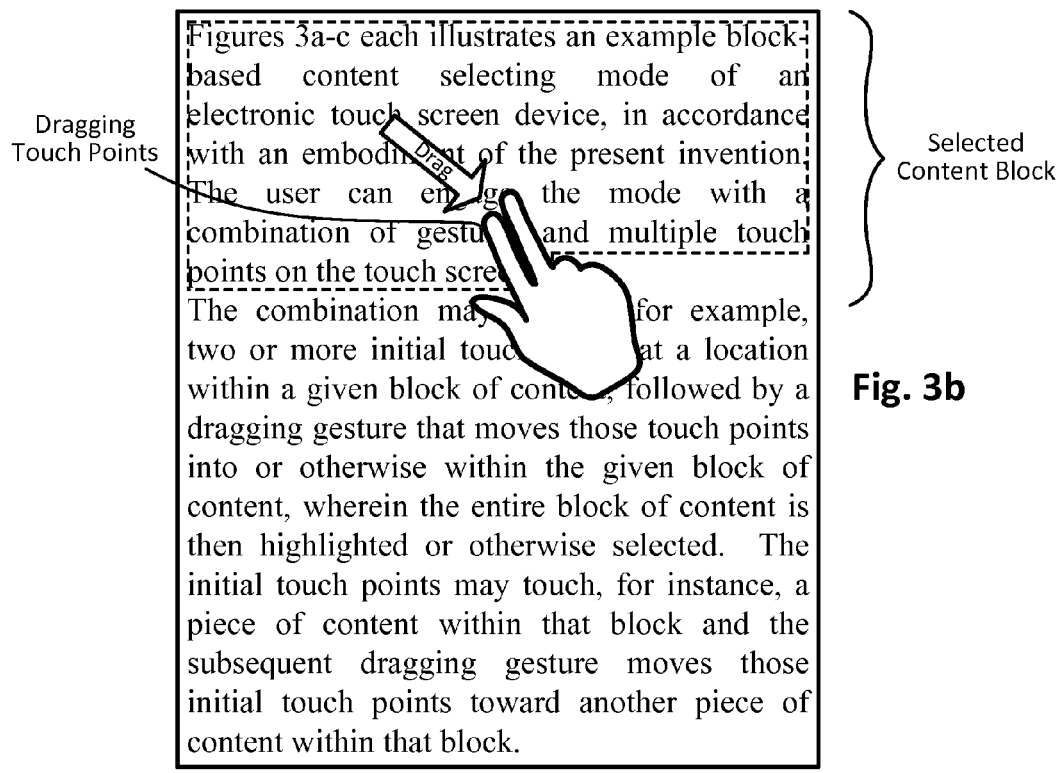
Figure 3C:
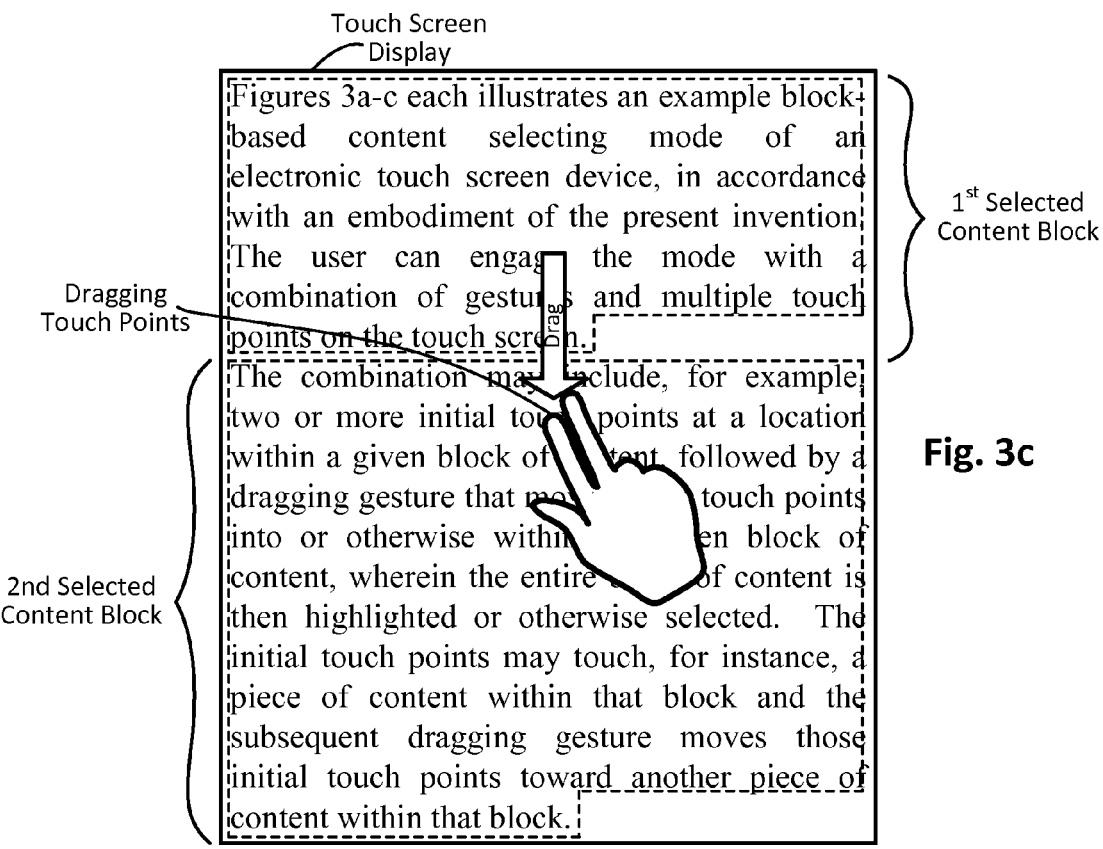
Figure 3C:
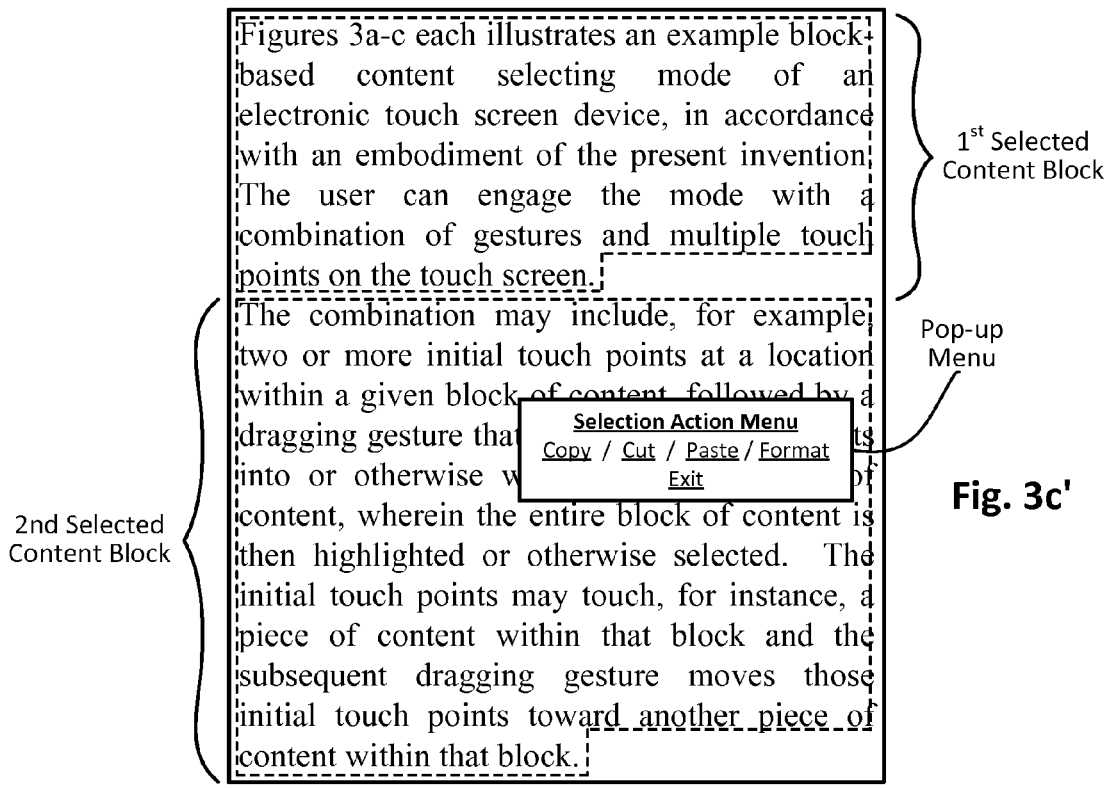

FIGS. 3a-c collectively illustrate an example content selecting mode that can be applied to a touch sensitive display of an electronic device, in accordance with an embodiment of the present invention. In this example case, the targeted content selection is on the same page, and within a continuous block of text. However, as will be appreciated in light of this disclosure, the targeted content selection may span any number of intervening section breaks, chapters, or pages.

In the example embodiment, the user is reading some text but the same techniques can be applied to any type of content, as previously explained. In FIG. 3a, the user is providing two initial touch points, where the initial piece of content is the word 'touch' generally in the middle of the first paragraph shown. As can be further seen in FIG. 3a, the initial piece of content is now selected, as indicated with a dashed border in this example case. The selecting may occur, for example, after a brief delay (e.g., 1 to 4 seconds) from application of the initial touch points, and/or upon dragging of the touch points. As can further be seen in FIG. 3b, the user has begun dragging the touch points, and the entire content block (a paragraph in this example case) is selected. Note how the block selecting/highlighting has advanced past the dragging touch points.

FIG. 3c shows the dragging touch points advancing into the next content block, which is the next paragraph in this example case. As can be seen, the block selection indicator has again advanced past the drag gesture, where the entire second content block is now selected as well as the first. As can be further seen in the example scenarios of FIGS. 3a-c, the initial and dragging touch points are provided by the user's fingers. Of course, these touch points can be made with other fingers, styluses, or any other implement or body part that can provide the requisite impact on the touch sensitive screen. Other embodiments may not have real-time block-based selecting that moves in unison with the drag gesture. For instance, in some embodiments, the target content blocks are highlighted or otherwise selected with a dashed box and/or coloration upon release of the dragging touch points, although such delayed highlighting might be less satisfying or otherwise helpful to the user than real-time or more instantaneous highlighting as previously described. As previously explained, other highlighting schemes may be used as well.

FIG. 3c' shows a result similar to FIG. 3c, except that a pop-up menu is provided automatically upon release of the dragging touch points. As can be seen, this optional pop-up menu provides a Selection Action Menu that includes a number of relevant actions that the user might wish to execute or otherwise carry out on the selected content. The actions in this example case include Copy, Cut, Paste, and Format operations, as well as an Exit to conclude the content selecting mode on that particular content selection. Each of these actions was previously explained, and that description is equally applicable here.

FIGS. 4a-d collectively illustrate an example content selecting mode that can be applied to a touch sensitive display of an electronic device, in accordance with another embodiment of the present invention. In this example case, the targeted content selection spans across three pages. The previous discussion with respect to type of content being selected, the manner in which touch points are provided, highlighting schemes, optional pop-up menus to facilitate user post-selection actions, and other such commonalities, is equally applicable here as will be apparent.

In FIG. 4a, the user is providing the initial touch points (two in this example case), where the initial piece of content is the word 'Figures' at the beginning of the first sentence shown on page 21. In FIG. 4b, the user has dragged the touch points (still two in this example case) and the target block of content is now selected, as indicated with a dashed border in this example case. In addition, note that the dragging touch points have reached the page break area of the displayed content.

At this point, the content selecting mode is programmed or otherwise configured to convert or otherwise treat the dragging gesture as an appropriate navigation gesture so as to get to the next page of content so that selecting can continue, in accordance with an embodiment of the present invention. In the example application depicted in FIG. 4b, which involves reading text, an appropriate navigation gesture might be, for instance, a page forward gesture (similar to a right-to-left swipe), which is a similar gesture the user might make if turning the page of a real book or hardcopy. In accordance with such an embodiment, the user does not have to actually make that navigation gesture; rather, the user can just hold the drag touch points on the page break area, so that the next page of content will display to the user for a brief moment (2 to 5 seconds) so that the user has time to evaluate the page of content for the desired end location, or otherwise to move the drag touch points off the page break area so as to allow the user time to evaluate the page of content for the desired end location. FIG. 4c simply shows the next page (page 22 in this example), as well as the continued holding of the dragging touch points at the page break area, thereby causing another navigation gesture, so as to advance to page 23.

Figure 4D:
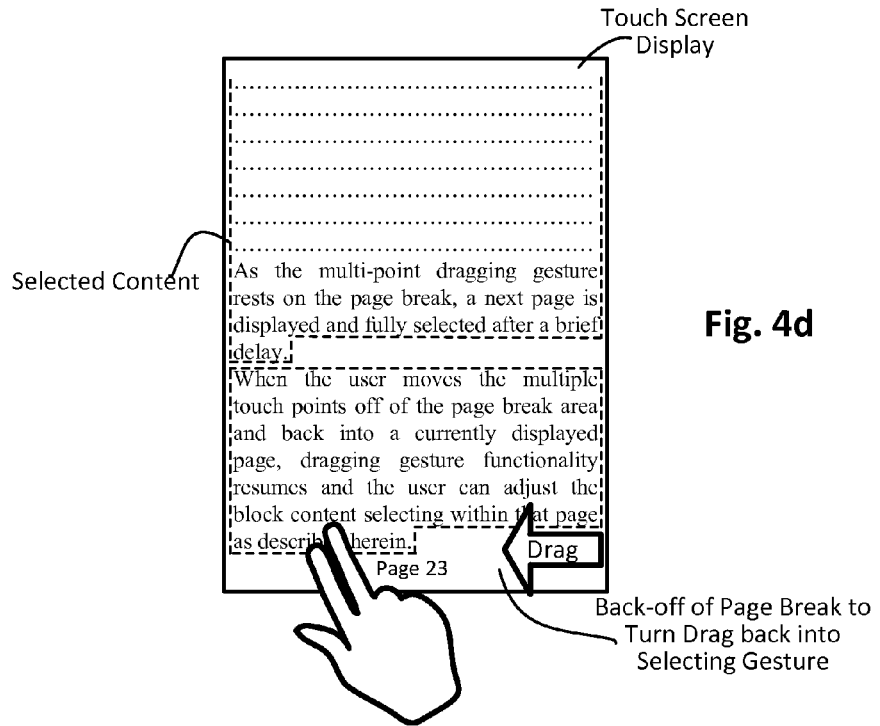

FIG. 4d of this example embodiment shows the user backing off the page break area (which happens to be the lower right corner in this example embodiment) and stopping the dragging touch points at a location within the last content block on page 23. As previously explained, the block-based selecting may be provided in real-time and in unison with the dragging touch points, or upon release of the dragging touch points if so desired. In this example embodiment, the target selection between (and including) the initial touch point on page 21 and the dragging end location on page 23 is highlighted or otherwise indicated with a dashed box, as collectively shown in FIGS. 4a-d.

Figure 4E:
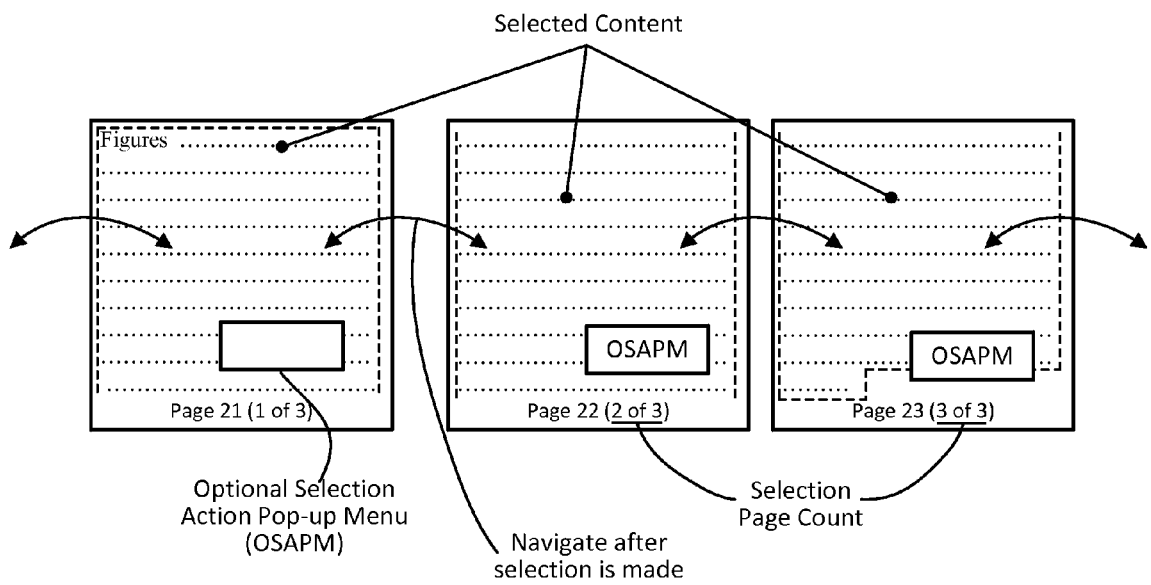

FIG. 4e shows an optional Selection Action Pop-up Menu (OSAPM) that can be provided automatically upon release of the dragging touch points, on each of the three pages involved in the user's selection, in accordance with an embodiment. As can be seen with further reference to FIG. 4e, the user may navigate back and forth while the selection remains selected, in this example embodiment, which may provide a reading guide for the user. In one such embodiment, for instance, a teacher may assign a portion of a given digital text book. The teach or the teacher's student can thus select that assigned section as described herein so that he/she knows when to stop reading. To this end, and in accordance with an embodiment of the present invention, further note with respect to FIG. 4e that upon release of the dragging touch points, not only is the target content selection selected but a 'Selection Page Count' UI feature (e.g., '(1 of 3)', '(2 of 3)', '(3 of 3)') is also displayed to the user so as to inform the user of the page numbers assigned to the multi-page content selection as well as how much more of the selected content remains from each given page. Once the student has finished the reading assignment, the content selecting mode can be exited. Such a content selection/highlighting and page numbering scheme may be useful in a number of other scenarios, as will be appreciated in light of this disclosure.

Recall that in some example scenarios, there may be selections of non-contiguous sections or blocks of content that were selected in a sequential and/or random fashion by the user using an initial touch point(s) that immediately transition or transition after a delay into multiple dragging touch points so as to effectively bookend each section/block as provided herein. In cases where the transition is immediate, note that the multiple dragging points effectively commence upon touching of the display. In this sense, the initial placement and dragging of touch points can be one fluid gesture.

Methodology

Figure 5:
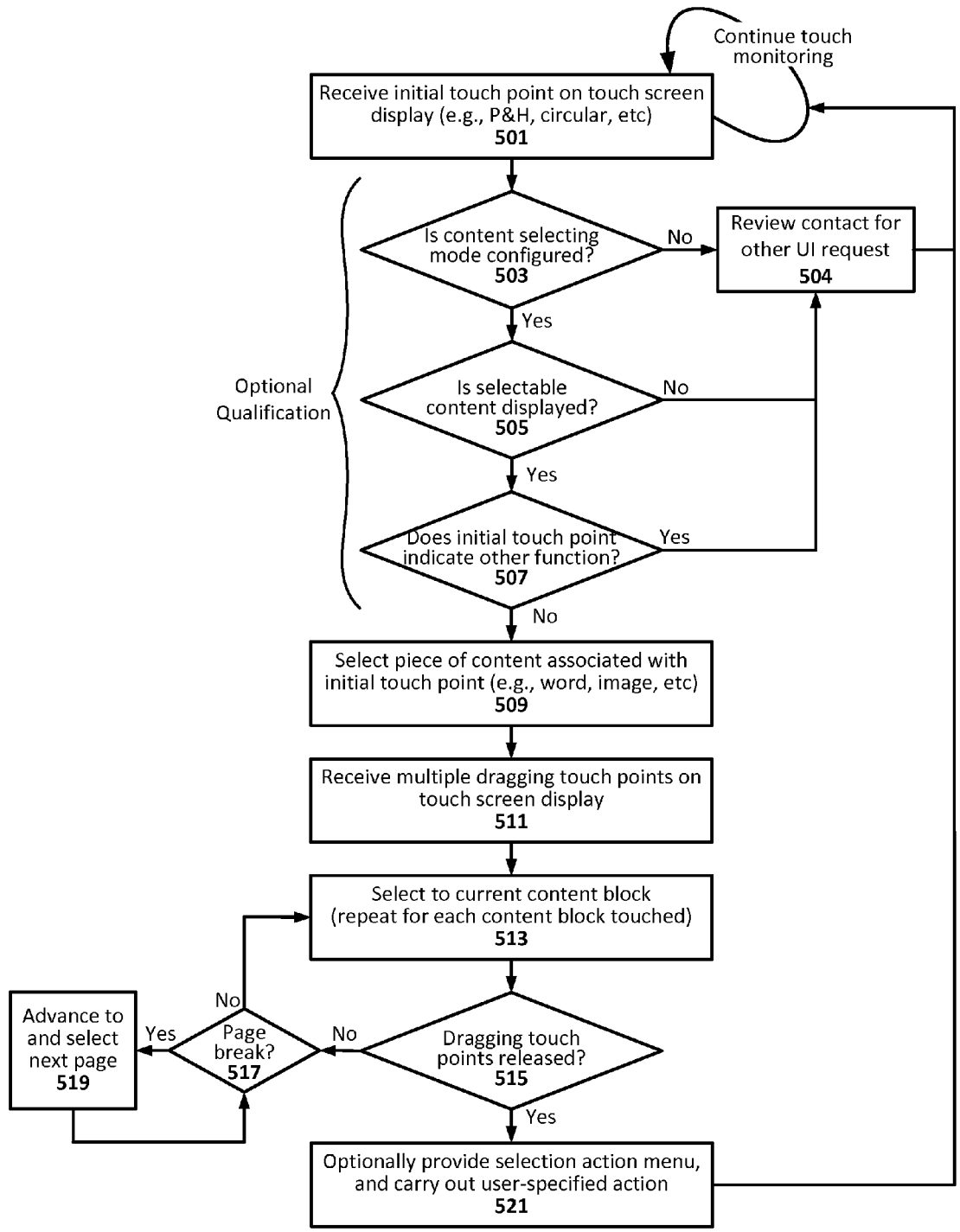
FIG. 5 illustrates a method for providing a content selecting mode in an electronic touch screen device, in accordance with an embodiment of the present invention.

FIG. 5 illustrates a method for providing a content selecting mode in an electronic touch sensitive screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the UI can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a drag/move gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including a content selecting mode as variously described herein, as will be appreciated in light of this disclosure.

In this example case, the method includes receiving 501 an initial touch point at the touch screen interface. In general, the touch monitoring is effectively continuous. As previously explained, the initial touch point(s) may be provided in any number of ways, such as those discussed with reference to Table 1. The method may continue with some optional qualification processing, which may be helpful to distinguish one type of contact from another type. Thus, in this example, the method continues with determining 503 if the content selecting mode is configured. As previously explained, the selecting mode may be always enabled and configured from the factory in some embodiments, while other embodiments may be configured and/or enabled by the user. To this end, the determination at 503 ensures that the content selecting mode is a possible option for the contact just received.

In any case, if the content selecting mode is not enabled or otherwise available for whatever reason, then the method may continue with reviewing 504 the contact for some other UI request (e.g., select a file, send an email, etc). On the other hand, if the content selecting mode is enabled and available, the method continues with determining 505 if selectable content is currently being displayed. If not, then it is not likely that the content selecting mode is desired, so the method may again continue with reviewing 504 the contact for some other UI request. However, if selectable content is currently being displayed, then the method may continue with determining 507 if the initial touch point indicates some other function is desired. If so (e.g., based on specificity of contact), then the method may again continue with reviewing 504 the contact for some other UI request.

If the initial touch point doesn't indicate some other function is desired, then it may be assumed that the content selecting mode is desired. As will be appreciated, other embodiments may not include the qualification processes at 503, 504, 505, and 507. In this example embodiment shown in FIG. 5, the post-qualification method continues with selecting 509 the piece of content associated with the initial touch point (e.g., word, image, etc). In some embodiments, a centroiding process may be executed in real-time to assist in determining the initial piece of content to highlight or otherwise select, in accordance with some such example embodiments.

The method continues with receiving 511 multiple dragging touch points on touch screen display. Recall that the initial touch point received at 501 may include one or more touch points, and if multiple initial touch points are provided, then no delay is required prior to the initial highlighting of the initial piece of content, in accordance with an embodiment. In other cases, the initial piece of content is highlighted upon application of the multiple dragging touch points, which may include the initial touch point plus one or more additional touch points. In one example embodiment, the initial touch point is a one or two finger press-and-hold that lasts about 1 to 3 seconds before transitioning into a multiple touch point drag gesture, but longer or otherwise more complex touches can be used to uniquely identify the initial touch point of the mode, if so desired.

The method continues with selecting 513 the entire current content block in which the drag touch points are moving. In some embodiments, this selecting may occur in unison with movement of the drag touch points, while in other embodiments the selecting occurs upon release of the drag touch points. In a more general sense, the block-based content selecting can be applied at any point after the user selection becomes apparent. The method may further include optionally determining 515 if the drag touch points have been released, and if so, optionally providing 521*a* selection action menu, so as to facilitate the user carrying out a particular action (e.g., copying, etc).

If on the other hand, the determination at 515 indicates that the drag touch points have not been released, then the method continues with determining 517 if a page break has been encountered. If not, then the selecting 513 from the initial touch point through the drag touch points continues. If on the other hand, the determination at 517 indicates that a page break has been encountered, then the method of this example embodiment continues with advancing 519 to the next page of content and selecting that page. The page break determination at 517 is repeated and advancing 519 to the next page (and selecting that page) continues until that determination at 517 is negative. At that point, the selecting 513 from the starting content block through and including the entire current content block continues.

The method may continue in the touch monitoring mode indefinitely or as otherwise desired, so that any contact provided by the user can be evaluated for use in the content selecting mode if appropriate. As previously indicated, the content selecting mode can be exited by, for example, the user pressing a release mode UI feature such as the home button or a touch screen feature.

Numerous variations and configurations will be apparent in light of this disclosure. For example, one example embodiment provides a device that includes a touch screen display for displaying content to a user and allowing user input, and a user interface including a content selecting mode that can be activated in response to user contact via the touch screen display, the user contact including an initial touch point targeting a block of displayed content and that transitions into a dragging touch point within the block of content, wherein the content selecting mode is configured to cause the entire block of displayed content to be selected. In some cases, the content selecting mode is configured to treat the multiple dragging touch points as a navigation gesture in response to those dragging touch points encountering a page break in the content. In some cases, a next page that is provided in response to the navigation gesture is fully selected. In some cases, the content selecting mode is further configured to provide a selection action user interface feature to be displayed to the user, the selection action user interface feature being executable on the selected content. In some cases, at least one of the initial touch point and/or the dragging touch point are user-configurable with respect to number of touch points provided. In some cases, the initial touch point and the dragging touch point each includes two or more touch points. In some cases, the content selecting mode is further configured to cause a selection page count to be displayed on each selected page of the content when multiple pages are selected, the selection page count corresponding to the number of pages included in the selected content and starting at page one. In some cases, the selected content remains selected until the content selecting mode is affirmatively terminated. In some cases, the initial touch point includes a press-and-hold gesture, a diagonal gesture, and/or a circular gesture. In some cases, the selected content advances past the dragging touch point. In some cases, the device is an eReader device or a tablet computer or a smartphone.

Another example embodiment of the present invention provides a mobile electronic device. The device includes a touch screen display for displaying content to a user and allowing user input, and a user interface including a content selecting mode that can be activated in response to user contact via the touch screen display, the user contact including an initial touch point targeting a block of displayed content and that transitions into multiple dragging touch points within the block of displayed content, wherein the content selecting mode is configured to cause the entire block of displayed content to be selected, such that the selected content advances past the dragging touch points. The content selecting mode is further configured to cause a piece of displayed content touched by the initial touch point to be highlighted after a brief delay from application of the initial touch point, or once the multiple dragging touch points are applied, or once the multiple dragging touch points begin to move. In some cases, the content selecting mode is further configured to provide a selection action user interface feature to be displayed to the user, the selection action user interface feature being executable on the selected content. In some cases, at least one of the initial touch point and/or the multiple dragging touch points are user-configurable with respect to number of touch points. In some cases, the content selecting mode is further configured to cause a selection page count to be displayed on each selected page of the content when multiple pages are selected, the selection page count corresponding to the number of pages included in the selected content and starting at page one. In some cases, the initial touch point includes, for example, a press-and-hold gesture, a diagonal gesture, and/or a circular gesture.

Another example embodiment of the present invention provides a computer readable medium encoded with instructions that when executed by one or more processors, cause a content selecting process to be carried out. The process includes, in response to user contact via a touch sensitive display device, activating a content selecting mode in the device, the user contact including an initial touch point targeting a block of displayed content and that transitions into a dragging touch point within the block of displayed content. The process further includes selecting the entire block of displayed content. In some cases, the content selecting process further includes treating the multiple dragging touch points as a navigation gesture in response to those dragging touch points encountering a page break in the content. In some cases, the content selecting process further includes causing a selection page count to be displayed on each selected page of the content when multiple pages are selected, the selection page count corresponding to the number of pages included in the selected content and starting at page one. In some cases, causing the entire block of displayed content to be selected includes selecting content that the dragging touch point has not yet touched.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A device, comprising:
   a touch screen display for displaying content to a user and allowing user input; and
   a user interface including a content selecting mode that can be activated in response to user contact via the touch screen display, the user contact including an initial press and hold touch point targeting a block of displayed content and that transitions into a dragging touch point within the block of content, wherein the content selecting mode is configured to cause only a piece of content that is within the block of content and that is touched by the initial press and hold touch point to be selected, and to further cause the entire block of displayed content to be selected only after the press and hold touch point transitions into the dragging touch point, and wherein the content selecting mode is further configured to assign each page of a multi-page selection with a selection page count commencing from one and sequentially increasing by one for each subsequent page in the selection, such that the first page of the selection is identified as page 1, and wherein the content selecting mode is further configured to cause each page of the selection to be displayed with the corresponding page number assigned by the content selecting mode, and wherein the selection page count assigned to and displayed on each page is in addition to original page numbering also displayed on each page of the selection.

2. The device of claim 1 wherein the content selecting mode is configured to treat the dragging touch point as a navigation gesture in response to that dragging touch point encountering a page break in the content.

3. The device of claim 2 wherein a next page that is provided in response to the navigation gesture is fully selected.

4. The device of claim 1 wherein the content selecting mode is further configured to provide a selection action user interface feature to be displayed to the user, the selection action user interface feature being executable on the selected content.

5. The device of claim 1 wherein at least one of the initial press and hold touch point and the dragging touch point are user-configurable with respect to number of touch points provided.

6. The device of claim 1 wherein the initial press and hold touch point and the dragging touch point each includes two or more touch points.

7. The device of claim 1 wherein the selected content remains selected until the content selecting mode is affirmatively terminated.

8. The device of claim 1 wherein the initial press and hold touch point includes two press and hold touch points that are applied simultaneously.

9. The device of claim 1 wherein the selected content advances past the dragging touch point.

10. The device of claim 1 wherein the device is an eReader device or a tablet computer or a smartphone.

11. A mobile electronic device, comprising:
    a touch screen display for displaying content to a user and allowing user input; and
    a user interface including a content selecting mode that can be activated in response to user contact via the touch screen display, the user contact including an initial press and hold touch point targeting a block of displayed content and that transitions into multiple dragging touch points within the block of displayed content, wherein the content selecting mode is configured to cause only a piece of content that is within the block of content and that is touched by the initial press and hold touch point to be selected, and to further cause the entire block of displayed content to be selected only after the press and hold touch point transitions into the dragging touch points, such that the selected content advances past the dragging touch points, and wherein the content selecting mode is further configured to assign each page of a multi-page selection with a selection page count commencing from one and sequentially increasing by one for each subsequent page in the selection, such that the first page of the selection is identified as page 1, and wherein the content selecting mode is further configured to cause each page of the selection to be displayed with the corresponding page number assigned by the content selecting mode, and wherein the selection page count assigned to and displayed on each page is in addition to original page numbering also displayed on each page of the selection.

12. The device of claim 11 wherein the content selecting mode is further configured to provide a selection action user interface feature to be displayed to the user, the selection action user interface feature being executable on the selected content.

13. The device of claim 11 wherein at least one of the initial press and hold touch point and the multiple dragging touch points are user-configurable with respect to number of touch points.

14. The device of claim 11 wherein the initial press and hold touch point includes two press and hold touch points that are applied simultaneously, and the multiple dragging touch points include two dragging touch points that are applied simultaneously.

15. A non-transient computer readable medium encoded with instructions that when executed by one or more processors, cause a content selecting process to be carried out, the process comprising:
    in response to user contact via a touch sensitive display device, activating a content selecting mode in the device, the user contact including an initial press and hold touch point targeting a block of displayed content and that transitions into a dragging touch point within the block of displayed content;
    initially selecting only a piece of content that is within the block of content and that is touched by the initial press and hold touch point to be selected; and selecting the entire block of displayed content only after the press and hold touch point transitions into the dragging touch point;

assigning each page of a multi-page selection with a selection page count commencing from one and sequentially increasing by one for each subsequent page in the selection, such that the first page of the selection is identified as page 1, and causing each page of the selection to be displayed with the corresponding page number assigned, and wherein the selection page count assigned to and displayed on each page is in addition to original page numbering also displayed on each page of the selection.

16. The computer readable medium of claim 15 wherein the content selecting process further includes treating the dragging touch point as a navigation gesture in response to that dragging touch point encountering a page break in the content.

17. The computer readable medium of claim 15 wherein causing the entire block of displayed content to be selected includes the selected content advances past the dragging touch point.

\* \* \* \* \*